United States Patent [19]

Goode

[11] Patent Number: 4,539,524
[45] Date of Patent: Sep. 3, 1985

[54] METHOD AND COHERENT DEMODULATORS FOR MSK SIGNAL

[75] Inventor: Steven H. Goode, Palatine, Ill.

[73] Assignee: Motorola, Inc., Schaumburg, Ill.

[21] Appl. No.: 567,119

[22] Filed: Dec. 30, 1983

[51] Int. Cl.³ .............................................. H04L 27/14
[52] U.S. Cl. ..................................... 329/50; 329/122; 329/124; 329/154; 375/81; 375/88; 375/90; 375/94; 375/110
[58] Field of Search ................ 329/50, 105, 110, 122, 329/124, 153, 154; 375/80, 81, 88, 90, 94, 110, 120

[56] References Cited

U.S. PATENT DOCUMENTS

| 4,027,265 | 5/1977 | Kobayashi et al. | 329/122 |
| 4,028,490 | 6/1977 | Epstein | 375/90 |
| 4,072,905 | 2/1978 | Keelty | 329/122 |
| 4,100,499 | 7/1978 | Monrolin | 329/50 |
| 4,229,821 | 10/1980 | deJager et al. | 375/53 |
| 4,234,852 | 11/1980 | McCorkle | 329/50 |
| 4,324,001 | 4/1982 | Rhodes | 375/90 |
| 4,338,574 | 7/1982 | Fujita et al. | 331/1 A |
| 4,339,725 | 7/1982 | Ichiyoshi | 329/122 X |
| 4,361,894 | 11/1982 | Kurihara et al. | 375/80 |
| 4,409,562 | 10/1983 | Kurihara | 329/50 X |
| 4,414,675 | 11/1983 | Comroe | 375/90 |

OTHER PUBLICATIONS

Rudi deBuda publication entitled, "Coherent Demodulation of Frequency-Shift Keying with Low Deviation Ratio", IEEE Transactions on Communications, Jun. 1972, pp. 429-435.

Frank Amoroso and James Kivett publication entitled, "Simplified MSK Signaling Technique", IEEE Transactions on Communications, Apr. 1977, pp. 433-441.

Frank deJager and Cornelis B. Dekker publication entitled, "Tamed Frequency Modulation, A Novel Method to Achieve Spectrum Economy in Digital Transmission", IEEE Transactions on Communications, vol. COM-26, No. 5, May 1978, pp. 534-542.

Primary Examiner—Siegfried H. Grimm
Attorney, Agent, or Firm—James E. Jacobson, Jr.; Edward M. Roney; James W. Gillman

[57] ABSTRACT

Improved method and apparatus in the form of coherent demodulators for MSK signal or other angle-modulated carrier signals of substantially constant amplitude and continuous phase are provided. The coherent demodulators include a frequency doubler, a first mixer for multiplying the frequency doubled signal with a half clock signal to produce a carrier term signal, a bandpass filter for filtering the carrier term signal and a divider coupled to the carrier bandpass filter to produce a coherent carrier signal. The half clock signal is generated by multiplying the frequency doubled signal with the filtered ouput signal of the carrier bandpass filter by a second mixer, and bandpass filtering the output signal of the second mixer to produce the half clock signal. The received binary data modulated signal and the generated coherent carrier signal are input to a quadrature detector for recovering the binary data.

9 Claims, 3 Drawing Figures

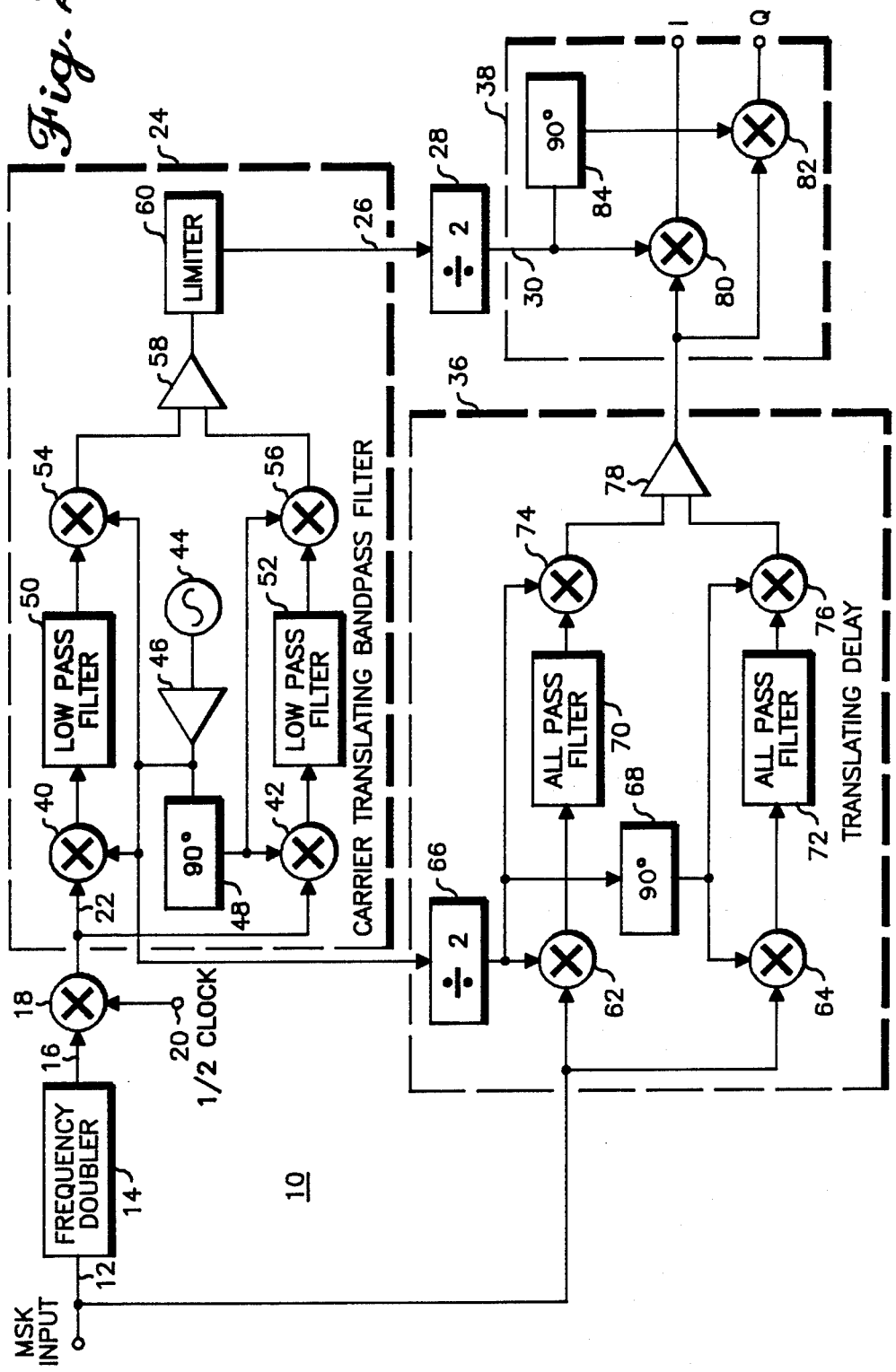

METHOD AND COHERENT DEMODULATORS FOR MSK SIGNAL

BACKGROUND OF THE INVENTION

The present invention relates generally to coherent demodulators for a frequency shift keyed (FSK) signal and more particularly to coherent detectors for a type of frequency shift keyed signal commonly referred to as a minimum shift keyed (MSK) signal that may be advantageously utilized in data communication systems.

MSK is particularly well suited for use in radio communication systems since the spectral energy is more easily contained within the limited bandwidth available than other binary frequency or phase-shift keying modulations. Frequency shift key (FSK) signals result when binary data modulate a carrier by shifting its frequency between two distinct levels known as mark and space tones or frequencies depending on the value of a binary digit or bit being transmitted. A MSK signal is a continuous-phase-frequency-shift-keying (CPFSK) system with a modulation index of one-half. Therefore, the upper and lower tones are frequency shifted by one-fourth of the transmitter data bit rate above and below the carrier frequency. MSK is a constant amplitude signal allowing the use of well known FM transmitter and receiver techniques.

A type of frequency modulation called tamed frequency modulation for binary data transmission employs an angle-modulated carrier signal of substantially constant amplitude and continuous phase, whose continuous phase in each symbol period T changes by an amount, expressed in radians from the series $-\pi/2$, $-\pi/4$, $0$, $\pi/4$, $\pi/2$. The tamed frequency modulated signal also is a binary data modulated signal of constant amplitude allowing the use of well known FM transmitter and receiver techniques.

The binary signals can be detected optimally by means of coherent signal detectors which advantageously exploit the unique characteristics of both the MSK signal and tamed frequency modulation. Coherent signal detectors use the phase of the signaling tones to detect the transmitted bits. As such, this type of demodulator usually consists of two parts, a device which extracts the bit clock and the phase of the signaling tones, and a detector which uses the extracted signal phase.

One known coherent demodulator employs two phase-locked loops (PLL), that are operated in parallel and are intended to lock onto two separate frequencies to extract the mark and space frequencies. The PLL's are susceptible to interference and can lock onto the wrong frequency. Also, the PLL when locked to the desired frequency can unlock due to interference, and the PLL's cannot track large phase changes due to a fading field. A frequency synthesizer and control logic circuitry has been used with the two PLL's to provide more reliable operation, but such a coherent demodulator has a high cost. Other known more reliable coherent demodulators also require complex circuitry and consequently also have a high cost.

SUMMARY OF THE INVENTION

Accordingly, it is an object of the present invention to provide a method and apparatus in the form of a reliable and relatively inexpensive coherent demodulator for an MSK signal.

It is another object of the present invention to provide an improved, reliable coherent demodulator for an angle-modulated carrier signal of substantially constant amplitude and continuous phase.

It is a further object of the present invention to provide an improved, reliable coherent demodulator for a binary data modulated signal having improved response characteristics in a fading field.

According to the present invention, a method, together with apparatus to effect the method, is provided wherein the received MSK signal is frequency doubled and a half-clock signal is generated. The frequency doubled signal is multiplied by the half-clock signal to produce a coherent carrier term which is bandpass filtered and then divided by two to produce the coherent carrier signal. In the apparatus, means are included for utilizing the generated coherent carrier signal and the received binary data modulated signal to recover the desired binary data therefrom.

In one embodiment, the bandpass filtering may be provided by a translating bandpass filter including parallel lowpass filters and summing the outputs of the parallel lowpass filter paths to produce the filtered carrier signal. Alternately, the bandpass filtering may be performed using a phase lock loop. When the bandpass filtering is provided by a translating bandpass filter, the received MSK signal is delayed by a translating delay filter to match the phase response of the translating bandpass filter.

The present invention not only encompasses an inventive method and apparatus for the improved MSK signal demodulator, but also for other angle-modulated carrier signals of substantially constant amplitude and continuous phase, such as tamed frequency modulation.

BRIEF DESCRIPTION OF THE DRAWINGS

FIG. 2 is a partial schematic and block diagram of a preferred embodiment of a demodulator as shown in FIG. 1.

DETAILED DESCRIPTION OF THE PREFERRED EMBODIMENT

Figure 1:
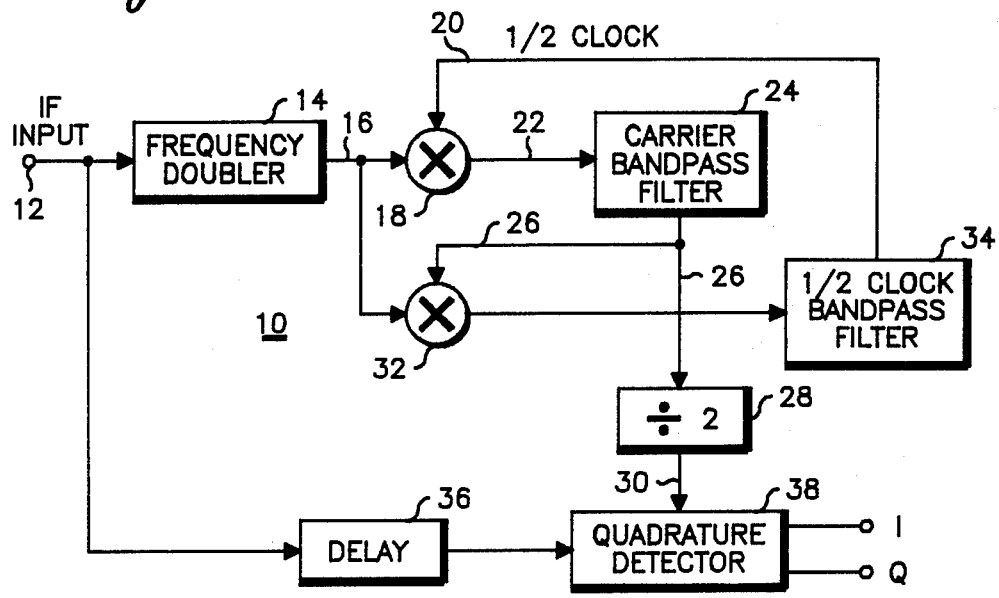
FIG. 1 is a block diagram of a demodulator according to the present invention.

Referring to FIG. 1, there is shown an improved coherent demodulator according to the invention and designated generally by the reference character 10. The coherent demodulator 10 conveniently can be employed after the intermediate frequency stage (not shown) of a conventional superhetrodyne FM receiver for detecting the binary data modulation of an angle-modulated carrier signal of substantially constant amplitude and continuous phase. The coherent detector 10 may be advantageously utilized for MSK data signals, including Gaussian (GMSK). Additionally, coherent demodulator 10 advantageously may be utilized for tamed frequency modulated signals. The coherent demodulator 10 has an input 12 which receives the binary data modulated signal output of the referenced intermediate frequency stage. The received MSK signal can be described mathematically as follows:

$$S(t) = \cos\left[2\pi f_c t + B_k(t)\frac{\pi t}{2T}\right] \quad 1.$$

where $f_c$ is the carrier frequency, $B_k(t)$ equals $\pm 1$ corresponding to the binary data modulation, where a binary value "1" corresponds to a value $+1$ and the binary value "0" to a value $-1$.

The received MSK signal is squared in a frequency doubler 14 to produce a frequency doubled output signal 16. The frequency doubled signal 16 can be described mathematically as follows:

$$S^2(t) = \cos\left[4\pi f_c t + B_k(t)\frac{\pi t}{2T}\right] \quad 2.$$

A mixer 18 multiplies the frequency doubled signal with a recovered half clock signal 20. The recovered half clock signal 20 equals $\cos(\pi t/T)$. A coherent carrier term output signal 22 is then provided by mixer 18. The coherent carrier term signal 22 can be described mathematically by the following equation:

$$S^2(t)\cos(\pi t/T) = \cos[4\pi f_c t] + \cos\left[4\pi f_c t \pm \frac{2\pi t}{T}\right] \quad 3.$$

The coherent carrier term 22 is applied to a carrier bandpass filter 24 to produce a filtered carrier term signal 26 which is then applied to a divide-by-2 circuit 28 to produce a coherent carrier signal 30. The half clock signal is generated from the frequency doubled signal 16 by multiplying the frequency doubled signal 16 with the filtered carrier term signal 26 by a mixer 32. The output of mixer 32 is applied to a bandpass filter 34 to derive the half clock signal 20.

A delay circuit 36 receives the MSK input signal and provides a delay to match the phase response of the carrier bandpass filter 24. The delayed MSK signal and the derived coherent carrier signal 30 are applied to a quadrature detector 38 for recovery of the binary data.

Referring now to FIG. 2, there is shown a preferred embodiment of a demodulator as shown in FIG. 1. Identical numbers have been used to indicate the same components.

The coherent carrier term signal 22 is filtered by a translating bandpass filter 24 comprising first mixers 40, 42 and oscillator 44, buffer amplifier 46, quadrature phase shift circuit 48, low pass filters 50, 52, second mixers 54, 56, summing circuit 58, and limiter 60. This translating bandpass filter 24 provides improved transient response to phase changes due to a fading field, as compared to a phase lock loop for bandpass filtering.

The coherent carrier term output signal 22 is applied to mixers 40, 42 to produce quadrature and in-phase output signals. Oscillator 44 provides a signal output of a predetermined frequency according to the carrier frequency. Amplifier 46 amplifies the signal output of oscillator 44 and the amplified output signal is applied to mixer 40. The amplified output signal of amplifier 46 is also applied to a quadrature phase shift, or $+90°$ shift circuit 48 to form a quadrature signal that is applied to mixer 42. Mixer 40 produces an in-phase output signal that is applied to a low pass filter 50. The quadrature output signal of mixer 42 is applied to a low pass filter 52. The filtered, in-phase signal output of low pass filter 50 is applied to a mixer 54, which multiplies the filtered in-phase signal with the amplified signal output of amplifier 46. The filtered, quadrature output of low pass filter 52 is applied to a mixer 56 which multiplies the quadrature output signal of quadrature phase shift circuit 48 with the filtered quadrature output of filter 52. The outputs of mixers 54, 56 are applied to a summing circuit 58 to recombine the in-phase and quadrature components back into a carrier signal. The output of summing circuit 58 is applied to a limiter 60 which removes any amplitude modulation. The limiter 60 produces a coherent carrier signal term 26. Coherent carrier term signal 26 is applied to a divide by two circuit 28 to provide a coherent carrier signal 30 that is coupled to the input of the quadrature detector 38.

The received MSK signal is input to a translating delay filter 36 to match the delay characteristics of bandpass filter 24. The received MSk signal is applied to parallel mixers 62, 64. The amplified output signal of amplifier 46 is applied to a divide-by-two circuit 66 and from there to mixer 62 and, through a quadrature phase shift circuit 68, to mixer 64. The in-phase and quadrature output signals of mixers 62, 64 are applied to all pass filters 70, 72, respectively. The in-phase, filtered output signal of filter 70 is applied to a mixer 74 which multiplies the filtered in-phase signal with the output signal of divide-by-two circuit 66. The quadrature, filtered output of filter 72 is applied to a mixer 76, which multiplies the quadrature, filtered signal with the quadrature output signal of the $+90°$ shift circuit 68. The outputs of mixers 74, 76 are applied to a summing circuit 78 that recombines the in-phase and quadrature signals.

The time delayed incoming MSK signal output of translating delay filter 36 is applied to the quadrature detector 38 which includes mixers 80, 82 and quadrature phase shift circuit 84. The time delayed MSK signal is applied to mixers 80, 82. The coherent carrier signal 30 is applied to mixer 80 and also through quadrature phase shift circuit 84 to mixer 82. Mixers 80, 82 multiply the coherent carrier signal 30 with the time delayed MSK signal to demodulate the parallel data bit streams in the incoming MSK signal from the carrier of the incoming MSK signal. Quadrature detector 38 provides parallel in-phase (I) and quadrature (Q) outputs.

Figure 3:
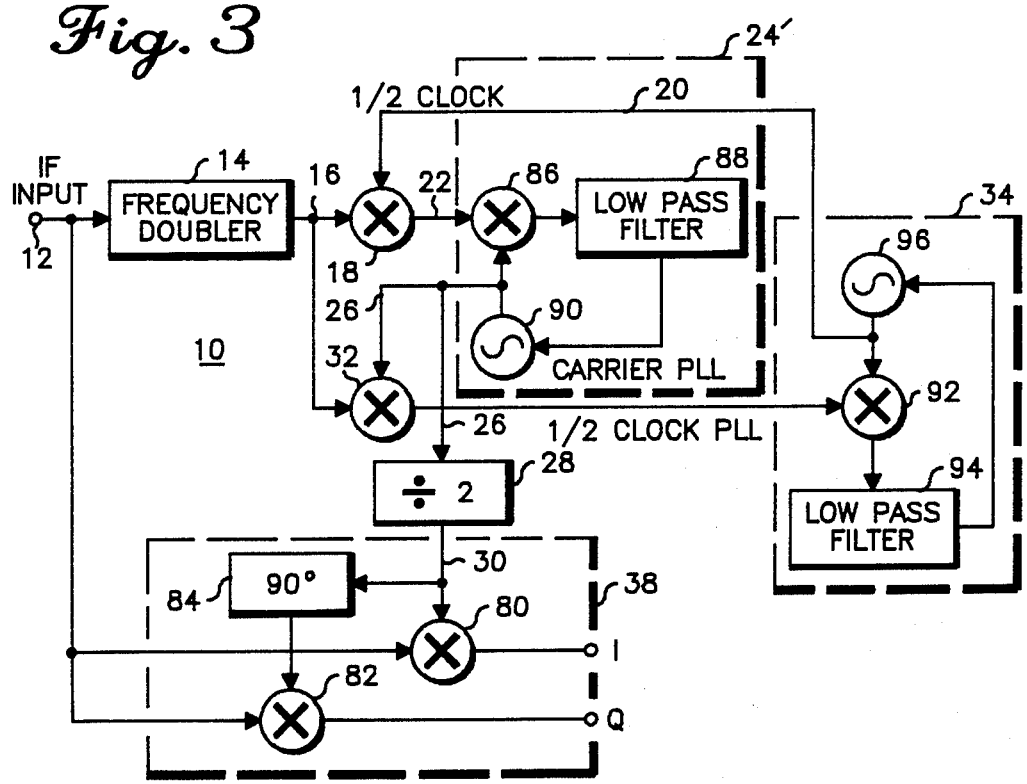
FIG. 3 is a partial schematic and block diagram of an alternate embodiment of the demodulator as shown in FIG. 1.

Referring now to FIG. 3, there is shown an alternate embodiment of the demodulator illustrated in FIG. 1. Identical numbers have been used to indicate the same components.

A carrier bandpass filter 24' constitutes a phase locked loop comprising mixer 86, lowpass filter 88 and a voltage controlled oscillator 90. The coherent carrier term 22 is applied to mixer 86 which multiplies the coherent carrier term 22 with the output signal 26 of voltage controlled oscillator 90. The output of mixer 86 is applied to the lowpass filter 88. The filtered carrier term output of filter 88 is applied to voltage controlled oscillator 90 to produce the coherent carrier term signal 26. As hereinbefore described with reference to FIG. 1, coherent carrier term signal 26 is applied to a divide-by-two circuit 28 to provide a coherent carrier signal 30 that is coupled to the input of the quadrature detector 38.

The half clock signal 20 is recovered from the frequency doubled signal 16 using a second phase locked loop for filtering the half clock signal. Phase locked loop 34 includes a mixer 92, a lowpass filter 94 and a voltage controlled oscillator 96. The output of mixer 32 is applied to mixer 92 which multiplies the output of mixer 32 with the output of voltage controlled oscillator 96. The output of mixer 92 is applied to a lowpass filter 94. The filtered signal output of lowpass filter 94 is applied to the voltage controlled oscillator 96 to produce the half clock signal 20.

The phase relationship between the received MSK signal and the detected carrier signal 30 is preserved by using the phased locked loop 24' for bandpass filtering the carrier signal, so that delay 36 of FIGS. 1 and 2 is not required. Likewise a coherent half clock signal 20 is generated by using a phased locked loop for bandpass filtering the half clock signal.

In summary, an improved method and demodulators for MSk signals and other angle-modulated carrier signals of substantially constant amplitude and continuous phase have been described.

While preferred embodiments of the invention have been described in detail, it should be understood that many modifications and variations are possible, all of which can fall within the spirit and scope of the invention.

What is claimed is:

1. A coherent demodulator for processing a received binary data modulated signal of substantially constant amplitude and continuous phase and carrying binary data at a predetermined bit rate, said demodulator comprising:
    means for frequency doubling the received signal;
    means for generating a half clock signal;
    means for multiplying said frequency doubled signal with said half clock signal to produce a coherent carrier term signal;
    means for bandpass filtering said coherent carrier term signal;
    divider means coupled to the output of said bandpass filtering means for providing a coherent carrier output signal; and
    detector means for utilizing said generated coherent carrier signal and the received binary data modulated signal for recovering the binary data therefrom.

2. A coherent demodulator according to claim 1 wherein said means for bandpass filtering comprises a translating bandpass filter including:
    oscillator means for generating a reference frequency signal;
    means for multiplying said coherent carrier term signal with said reference frequency signal to produce in-phase and quadrature phase signals and for filtering the same; and
    means for multiplying said filtered in-phase and quadrature phase signals with said reference frequency signal and summing the resultant signals to form a coherent carrier signal.

3. A coherent demodulator according to claim 1 further comprising time delay means for delaying the received binary data modulated signal before inputting the same to said detector means.

4. A coherent demodulator according to claim 3 wherein said time delay means include a translating all-pass filter.

5. A coherent demodulator according to claim 1 wherein said bandpass filtering means comprises a phase locked loop.

6. A coherent demodulator according to claim 1 wherein said means for generating a half clock signal comprises a phase lock loop.

7. A method of generating a coherent carrier from a received binary data modulated signal of substantially constant amplitude and continuous phase carrying the binary data at a predetermined bit rate, said method comprising the steps of:
    frequency doubling the received binary data modulated signal;
    generating a half-clock signal;
    multiplying said frequency doubled signal with said half-clock signal to produce a coherent carrier term signal;
    bandpass filtering the coherent carrier term signal; and
    dividing the filtered carrier signal to produce a coherent carrier signal.

8. The method according to claim 7 wherein said bandpass filtering includes:
    generating a reference frequency signal;
    multiplying said coherent carrier term signal with said reference frequency signal to produce an in-phase signal;
    multiplying said coherent carrier term signal with a phase shifted reference frequency signal to produce a quadrature signal;
    filtering said in-phase signal and multiplying said filtered in-phase signal with said reference frequency signal;
    filtering said quadrature phase signal and multiplying said filtered quadrature phase signal with said phase shifted reference frequency signal; and
    summing the multiplied, in-phase and quadrature phase signals to form said coherent carrier signal.

9. The method according to claim 7 wherein said bandpass filtering includes applying the coherent carrier term signal to a phase locked loop circuit.

* * * * *